United States Patent
Fischer et al.

(10) Patent No.: US 6,959,945 B2
(45) Date of Patent: Nov. 1, 2005

(54) AIR BAG MODULE WITH VENT CONTROLLED BY TETHER

(75) Inventors: Kurt F. Fischer, Oxford, MI (US); Neal H. Delventhal, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 99 days.

(21) Appl. No.: 10/878,577

(22) Filed: Jun. 28, 2004

(65) Prior Publication Data

US 2004/0232677 A1 Nov. 25, 2004

Related U.S. Application Data

(63) Continuation-in-part of application No. 10/244,933, filed on Sep. 16, 2002.

(51) Int. Cl.⁷ .............................................. B60R 21/28
(52) U.S. Cl. .................................... 280/739; 280/743.2
(58) Field of Search ................................ 280/736, 739, 280/742, 743.2

(56) References Cited

U.S. PATENT DOCUMENTS

| | | | |
|---|---|---|---|
| 3,888,508 A | 6/1975 | Kizu et al. | |
| 5,246,250 A | 9/1993 | Wolanin et al. | |
| 5,405,166 A | 4/1995 | Rogerson | |
| 5,489,119 A | 2/1996 | Prescaro et al. | |
| 5,501,488 A | 3/1996 | Saderholm et al. | |
| 5,762,367 A | 6/1998 | Wolanin | |
| 5,799,974 A | 9/1998 | Honda | |
| 5,853,192 A | 12/1998 | Sikorski et al. | |
| 6,017,056 A | 1/2000 | Lee | |
| 6,095,557 A | 8/2000 | Takimoto et al. | |
| 6,131,942 A | 10/2000 | Fujii et al. | |
| 6,161,866 A | 12/2000 | Ryan et al. | |
| 6,206,408 B1 | 3/2001 | Schneider | |
| 6,371,517 B1 | 4/2002 | Webber et al. | |
| 6,648,371 B2 | 11/2003 | Vendely et al. | |
| 2003/0155756 A1 | 8/2003 | Hawthorn et al. | |
| 2003/0189326 A1 | 10/2003 | Short et al. | |

FOREIGN PATENT DOCUMENTS

| | | |
|---|---|---|
| DE | 19754280 | 7/1998 |
| DE | 19703945 | 8/1998 |
| DE | 19912369 | 10/2000 |
| DE | 10139626 | 3/2003 |
| DE | 10316026 | 10/2003 |
| DE | 10339031 | 3/2004 |
| EP | 0332325 | 9/1989 |
| EP | 1112902 | 7/2001 |
| EP | 1165349 | 1/2002 |
| EP | 1338480 | 8/2003 |
| GB | 2338214 | 12/1999 |
| WO | 9831570 | 7/1998 |
| WO | 03016106 | 2/2003 |

*Primary Examiner*—Paul N. Dickson
*Assistant Examiner*—Laura B. Rosenberg
(74) *Attorney, Agent, or Firm*—Tarolli, Sundheim, Covell & Tummino L.L.P.

(57) ABSTRACT

A vehicle occupant protection apparatus (10c) has an inflatable occupant protection device (12c) and a support member (20c) having a vent opening (44c). A vent member (46c) is associated with the vent opening (44c). A tether (50c) extends between the protection device (12c) and the vent member (46c). The vent member (46c) is initially in a first condition closing the vent opening (44c). The vent member (46c) is moved to a second condition spaced apart from the vent opening (44c) and enabling fluid flow through the vent opening (44c) upon initial inflation of the protection device (12c). The vent member (46c) is moved from the second condition back toward the first condition by tension in the tether (50c) that results from inflation of the protection device (12c) away from the support member (20c) by more than a predetermined distance.

11 Claims, 5 Drawing Sheets

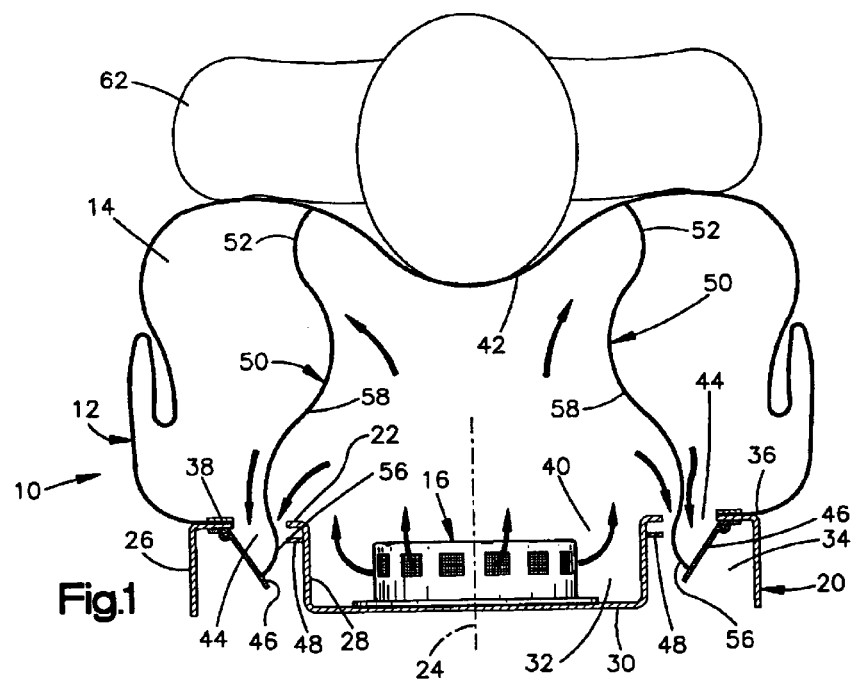
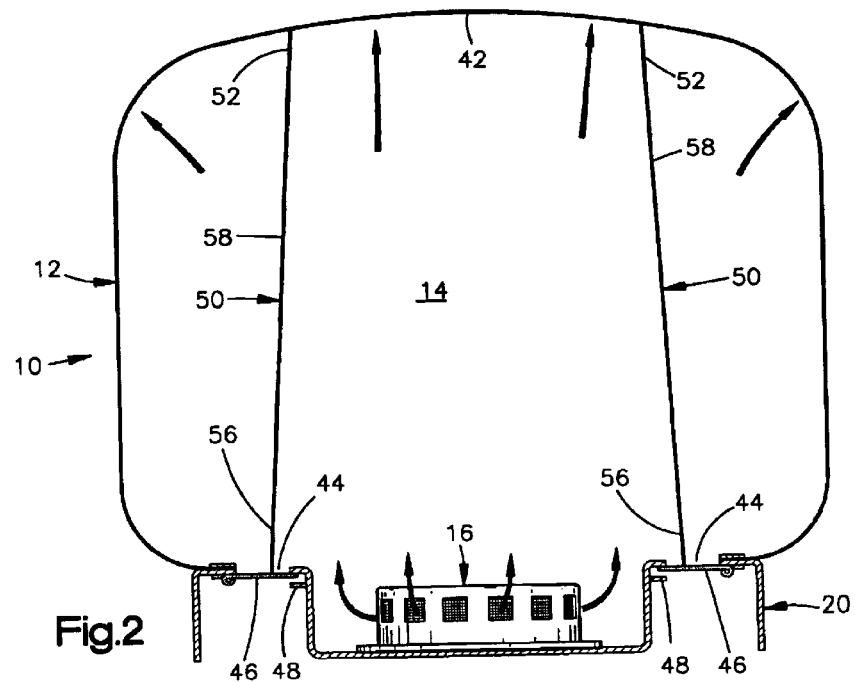

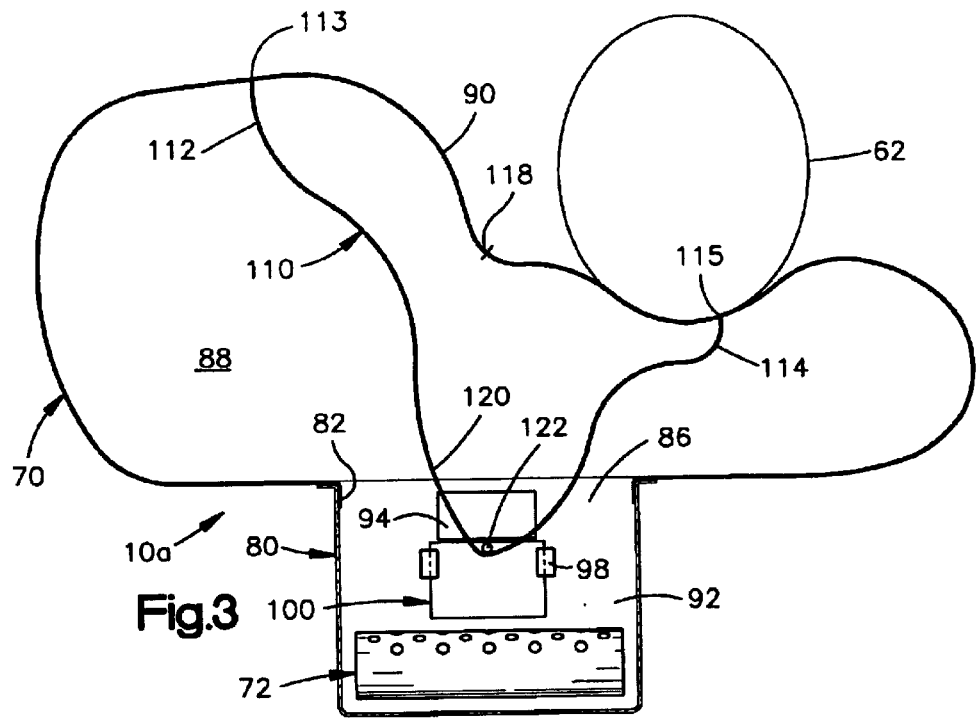
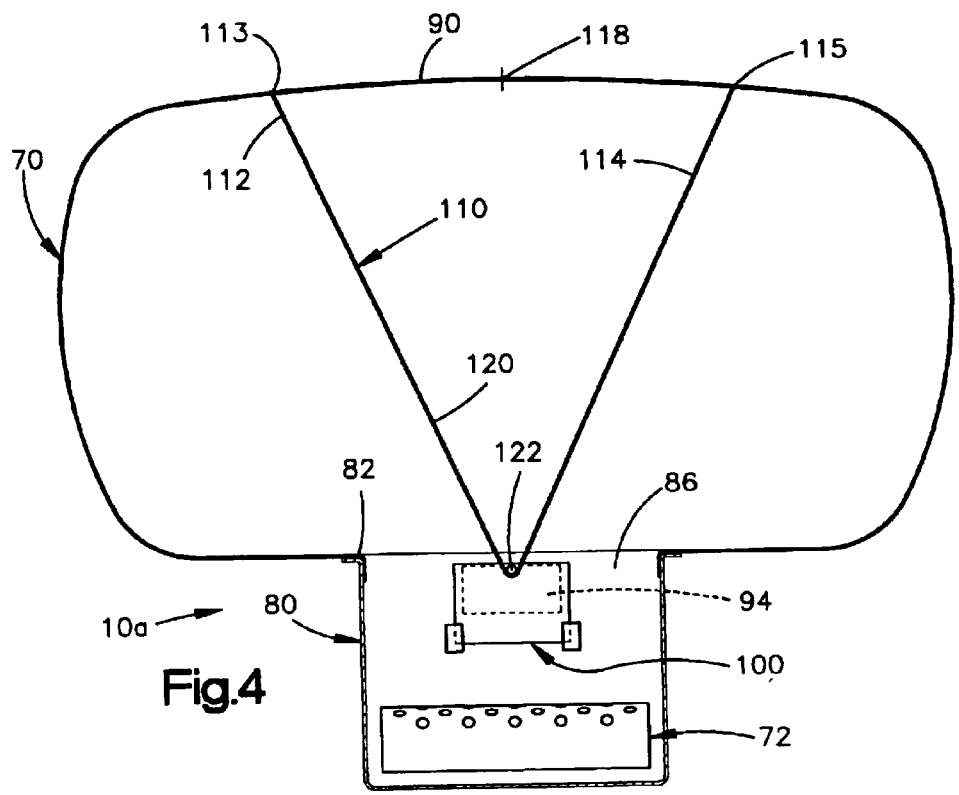

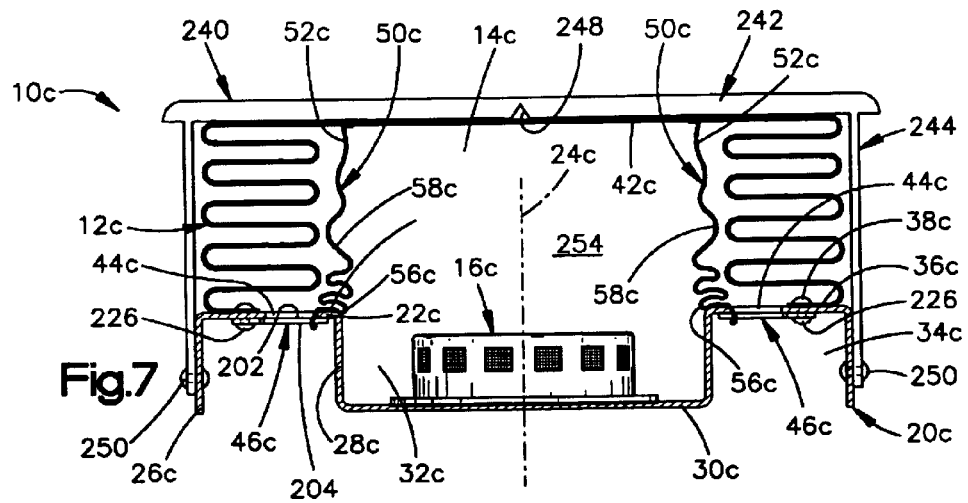
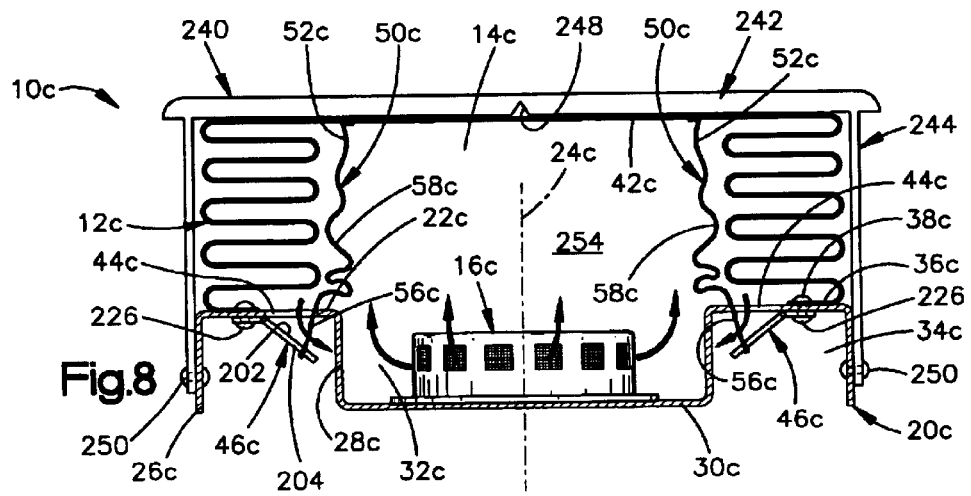
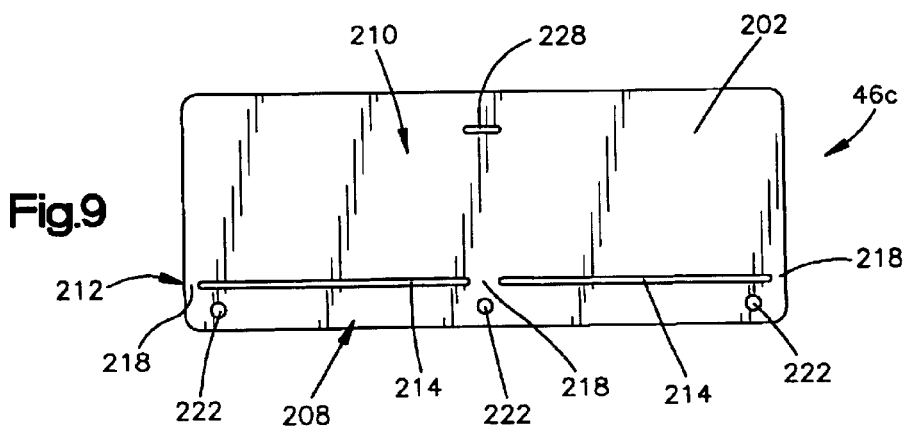

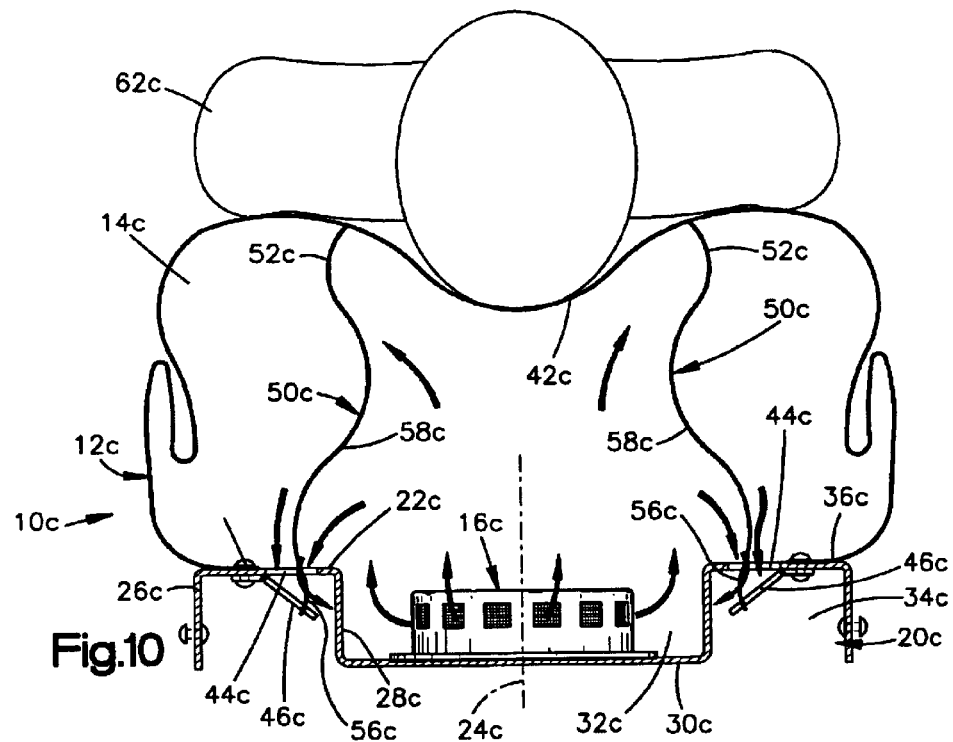
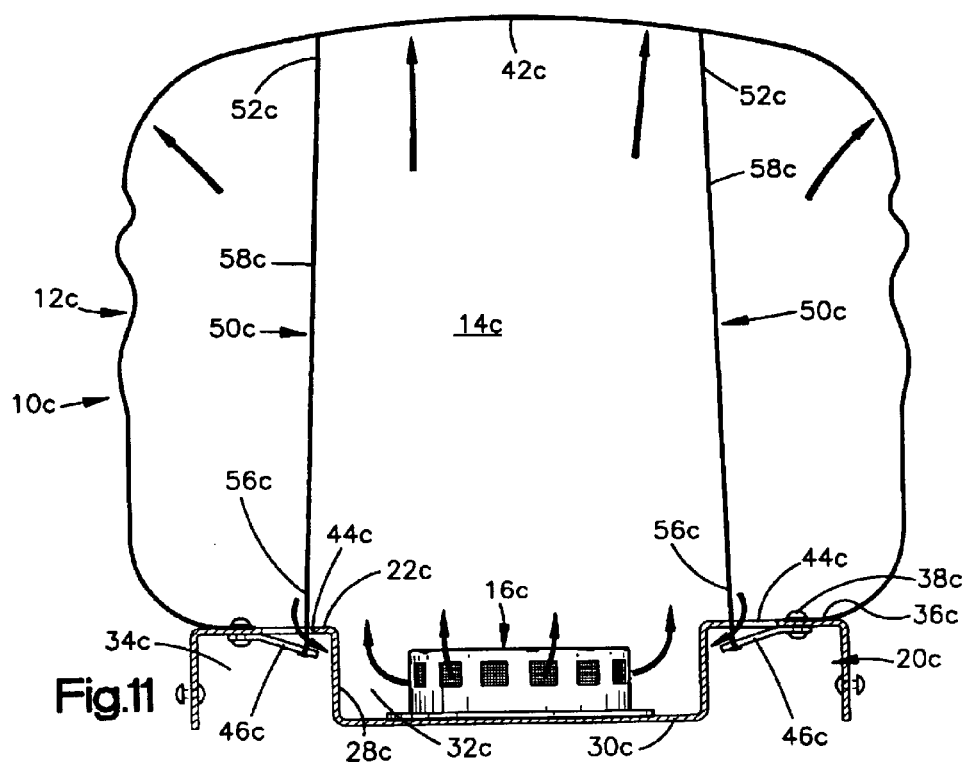

AIR BAG MODULE WITH VENT CONTROLLED BY TETHER

RELATED APPLICATIONS

This application is a continuation-in-part of copending patent application Ser. No. 10/244,933, filed Sep. 16, 2002.

TECHNICAL FIELD

The present invention relates to a vehicle occupant protection apparatus. In particular, the present invention relates to an air bag module having a vent that is moved between an open condition and a closed condition by a tether of an air bag.

BACKGROUND OF THE INVENTION

It is known to provide an air bag with a vent. The vent is operative, when the air bag inflates to help protect a vehicle occupant, to discharge inflation fluid from the air bag. In some air bags, the vent may be selectively opened depending on sensed factors, for example, whether the occupant's seat belt is buckled. In other air bags, such as the one shown in U.S. Pat. No. 5,405,166, the vent is formed as two openings that are initially aligned so that the vent is initially open and then closes after the internal bag pressure reaches a predetermined amount. U.S. Pat. No. 5,246,250 shows an air bag that includes a tether attached to a valve flap panel to open or close a vent opening in the air bag when the air bag is inflated and the tether is actuated.

SUMMARY OF THE INVENTION

The present invention relates to a vehicle occupant protection apparatus comprising an inflatable vehicle occupant protection device and a support member having a vent opening. A vent member is associated with the vent opening and has a first condition in which the vent member closes the vent opening and a second condition in which the vent member is spaced apart from the vent opening enabling fluid flow through the vent opening. A tether extends between the protection device and the vent member. The vent member is initially in the first condition and is moved from the first condition to the second condition for enabling a flow of inflation fluid through the vent opening upon initial inflation of the protection device. The vent member is moved from the second condition back toward the first condition by tension in the tether that results from inflation of the protection device away from the support member by more than a predetermined distance.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a sectional view of a portion of a vehicle occupant protection apparatus including an inflatable driver side protection device and a vent in accordance with the present invention, with the vent being open;

FIG. 2 is a view similar to FIG. 1 showing the protection apparatus with the vent closed;

FIG. 3 is a sectional view of a portion of a vehicle occupant protection apparatus and a vent in accordance with a second embodiment of the present invention, with the vent being open;

FIG. 4 is a view similar to FIG. 3 showing the protection apparatus with the vent closed;

FIG. 7 is a sectional view of a vehicle occupant protection apparatus and a vent in accordance with a fourth embodiment of the present invention, with the vent in a first condition;

FIG. 8 is a view similar to FIG. 7 showing the protection apparatus with the vent in a second condition;

FIG. 9 illustrates a vent member for use with the vehicle occupant protection device of FIG. 7;

FIG. 10 illustrates the vehicle occupant protection apparatus of FIG. 7, with the air bag being partially inflated and the vent in the second condition; and FIG. 11 illustrates the vehicle occupant protection apparatus of FIG. 7, with the air bag being near full expansion and the vent being moved from the second condition toward the first condition.

DETAILED DESCRIPTION OF THE INVENTION

Figure 5:
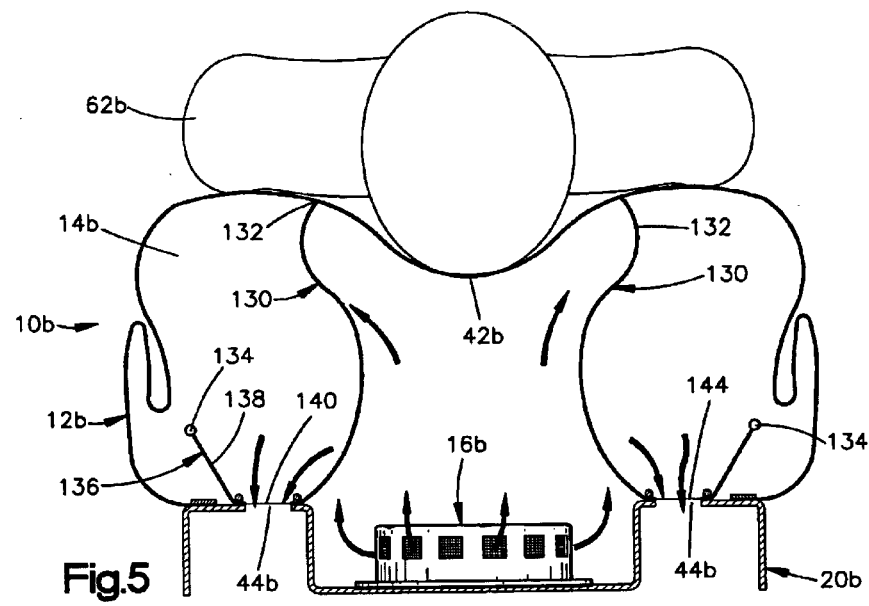
FIG. 5 is a sectional view of a portion of a vehicle occupant protection apparatus including an inflatable passenger side protection device and a vent in accordance with a third embodiment of the present invention, with the vent being open.

The present invention relates to a vehicle occupant protection apparatus. In particular, the present invention relates to an air bag module having a vent that is moved between an open condition and a closed condition by a tether of an air bag.

As representative of the invention, FIG. 1 illustrates schematically an air bag module 10 that includes an inflatable occupant protection device in the form of an air bag 12. Other vehicle occupant protection devices that can be used in accordance with the invention include, for example, inflatable seat belts, inflatable knee bolsters, inflatable head liners, inflatable side curtains, and knee bolsters operated by inflatable air bags.

The air bag 12 is preferably made from a flexible fabric material, such as woven nylon, and has an inflation fluid volume 14. The air bag 12 can alternatively be made from a non-woven material, such as plastic film. The air bag 12, when inflated, has a configuration similar to that illustrated in FIG. 2. The air bag 12 of FIGS. 1 and 2 is designed for a driver side application. The invention is applicable to air bags that are used in other locations, for example, passenger side air bags as described below with reference to FIGS. 5 and 6, or side impact air bags.

The module 10 includes an inflator 16 for inflating the air bag 12. The inflator 16 may contain a stored quantity of pressurized inflation fluid and an ignitable material for heating the inflation fluid. The module 10 alternatively could include an inflator 16 that uses the combustion of gas generating material to generate inflation fluid in the form of gas to inflate the air bag 12, or an inflator that contains only a stored quantity of pressurized inflation fluid for inflating the air bag.

The inflator 16 and the air bag 12 are supported on a support member 20. The support member 20 is a member or assembly that is fixed in position on the vehicle, that supports the inflator 16 and the air bag 12, and that receives the reaction forces of the inflator and the air bag when the inflator is actuated. In the illustrated embodiment, the support member 20 is a reaction plate.

The reaction plate 20 is a single piece of material, such as metal or high strength plastic, that is formed to the illustrated configuration. The reaction plate 20 has an annular main body portion 22 centered on an axis 24. A cylindrical rim or outer wall 26 of the reaction plate 20 extends downward (as viewed in FIG. 1) from the main body portion 22. A cylindrical inner wall 28 of the reaction plate 20 extends downward from the main body portion 22 and parallel to the outer wall 26, at a location spaced radially inward from the outer wall 26. A circular center wall 30 caps the inner wall 28.

The inner wall 28 and the center wall 30 of the reaction plate 20 define a cylindrical inflator mounting chamber 32. The inflator 16 is located in the chamber 32 and is secured to the reaction plate 20 in a manner not shown. The inner wall 28 and the outer wall 26 of the reaction plate 20 define a toroidal vent chamber 34, radially outward of the inflator mounting chamber 32.

A mouth portion 36 of the air bag 12 is secured to the main body portion 22 of the reaction plate 20 by a retainer or retainer ring 38. The mouth portion 36 defines an inflation fluid opening 40 for receiving inflation fluid from the inflator 16. The inflation fluid opening 40 allows inflation fluid to flow from the inflator 16 into the inflation fluid volume 14 of the air bag 12 when the inflator is actuated. Opposite the mouth portion 36, the air bag 12 has an outer panel 42 that is located distant from the reaction plate 20 when the air bag is inflated.

Two diametrically opposed vent openings 44 are formed in the main body portion 22 of the reaction plate 20, radially inward of the mouth portion 36 of the air bag 12. The vent openings 44 are identical to each other, each having a circular configuration. It should be understood that more than two vent openings 44 or fewer than two vent openings can be provided, and at locations different than that shown. Also, each vent opening 44 could have a configuration other than a circular configuration, and if plural vent openings are provided, they could have configurations different from each other.

Because the vent openings 44 are located in the main body portion 22 of the reaction plate 20 radially inward of the mouth portion 36 of the air bag 12, the vent openings are in fluid communication with the inflation fluid volume 14 of the air bag. As a result, at least some of the inflation fluid flowing from the inflator 16, when the inflator is actuated, flows across or into the vent openings 44 in the reaction plate 20.

The module includes two vent members 46 for selectively closing the vent openings 44. Each one of the vent members 46 is associated with a respective one of the vent openings 44. The two vent members 46 are identical in the illustrated embodiment.

Each vent member 46 is configured as a circular door that is supported on the reaction plate 20 for pivotal movement relative to the reaction plate. The door 46 is pivotally mounted to the reaction plate at a location adjacent the mouth portion 36 of the air bag 12. The module 10 includes a latch shown schematically at 48 on the inner wall 28 of the reaction plate 20, adjacent each vent opening 44. The latch 48 may be a spring loaded latch member or a bendable tab on the reaction plate 20, for example.

The door 46 has a first condition shown in FIG. 1 in which the door is spaced apart from the vent opening 44 in the reaction plate 20. When the door 46 is in the first condition, the door is pivoted away from the vent opening 44 and away from the inflation fluid volume 14 of the air bag 12 (downward as viewed in FIG. 1), into the vent chamber 34 in the reaction plate 20. When the door 46 is in the first condition, the vent opening 44 is not blocked, and inflation fluid can flow away from the air bag 12 through the vent opening.

The door 46 has a second condition shown in FIG. 2 in which the door is pivoted upward and overlies the vent opening 44 in the reaction plate. The latch 48 holds the door 46 in the second or closed condition. When the door 46 is in the second condition, the vent opening 44 is blocked and inflation fluid cannot flow away from the air bag 12 through the vent opening.

The module 10 includes one or more tethers 50 for controlling or limiting deployment of the air bag 12. In the illustrated embodiment, two identical tethers 50 are provided. Tethers 50 in accordance with the present invention may take any one of many different forms. In the illustrated embodiment, each tether 50 is a narrow, elongate piece or strip of fabric material having a width of from about one-half inch to about two inches. The tether 50 may be made from the same material as the air bag 12, or may be made from a different material. The tether 50 is not, per se, part of the air bag 12, in the sense that the air bag can deploy and inflate whether the tether is present or not.

The tether 50 has a first end portion 52 that is fixed to the outer panel 42 of the air bag 12 by sewing. The first end portion 52 of the tether 50 is thus connected for movement with the air bag 12 as the air bag is deployed.

An opposite second end portion 56 of the tether 50 is connected with or fixed to a vent door 46 for transferring tensile force from the air bag 12 and the tether 50 to the vent door. The second end portion 56 of the tether 50 may be formed as a loop that extends through or around a portion of the door 46 to couple the door for movement with the second end portion of the tether. The second end portion 56 of the tether 50 may be secured to the vent door 46 in another manner, for example, by adhesive. An intermediate portion 58 of the tether 50 extends between and interconnects the first and second end portions 52 and 56.

When the air bag 12 is in a deflated condition (not shown), the outer panel 42 of the air bag is close to or adjacent the mouth portion 36. There is a significant amount of slack in the tether 50. The slack is present because the length of the tether 50 is greater than the distance between the portion of the air bag 12 where the first end portion 52 of the tether is fixed to the outer panel 42 and the portion of the air bag 12 adjacent the second end portion 56 of the tether. In the illustrated embodiment, the slack is provided by the intermediate portion 58 of the tether 50. Because the slack is present, the vent doors 46 are not pulled closed against the reaction plate 20 when the air bag 12 is in the deflated condition, and inflation fluid may be able to flow away from the air bag through the vent openings 44.

If the air bag 12 is to be inflated, an actuation signal is transmitted to the inflator 16. When the inflator 16 is actuated, it emits a large volume of inflation fluid through the mouth portion 36 of the air bag 12 and into the inflation fluid volume 14 of the air bag. The air bag 12 inflates, as shown in FIGS. 1 and 2.

As the air bag 12 inflates, the outer panel 42 of the air bag moves away from the reaction plate 20 and the vent doors 46. If the air bag 12 inflates by less than a certain amount (FIG. 1), the outer panel 42 moves away from the reaction plate 20 by less than a predetermined distance. This might happen, for example, if the air bag 12 when inflating contacts a vehicle occupant (as shown schematically at 62 in FIG. 1) positioned relatively close to the reaction plate 20.

The engagement of the air bag 12 with the relatively close vehicle occupant 62 stops or limits outward movement of the outer panel 42 of the air bag. When this occurs, the tethers 50 are not stretched out sufficiently to remove the slack from the tethers. The tethers 50 do not pull on the vent doors 46, and the vent doors remain in the first condition, spaced apart from the vent openings 44. The vent openings 44 remain open, enabling flow of inflation fluid away from the air bag 12 through the vent openings. This venting of the air bag 12 can reduce the force and pressure with which the air bag inflates.

If the air bag 12 inflates by more than a certain amount (FIG. 2), the outer panel 42 moves away from the reaction plate 20 by a predetermined amount. Such movement might occur if the air bag 12 inflates fully to help protect a vehicle occupant seated against the vehicle seat back. This movement of the outer panel 42 away from the reaction plate 20 by the predetermined amount causes the tethers 50 to be tensioned, as shown in FIG. 2. The distance between the first end portions 52 of the tethers 50 and the second end portions 56 of the tethers increases. The slack is pulled out of the tethers 50 and the tethers pull the vent doors 46 into the second condition or closed condition shown in FIG. 2. The vent openings 44 are closed, blocking flow of inflation fluid away from the air bag 12 through the vent openings. The latches 48 hold the vent doors 46 closed. The air bag 12 inflates with full force and pressure.

FIGS. 3 and 4 illustrate an air bag module 10a in accordance with a second embodiment of the invention. The air bag module 10a is a passenger side frontal air bag module that includes an air bag 70 and an inflator 72 for inflating the air bag. The air bag 70 and the inflator 72 are mounted on a support member 80. In the illustrated embodiment, the support member 80 is a reaction canister mounted in a vehicle instrument panel. The reaction canister 80 could alternatively be part of the instrument panel itself.

A mouth portion 82 of the air bag 70 is secured to the reaction canister 80. The mouth portion 82 defines an inflation fluid opening 86 for receiving inflation fluid from the inflator 72. The inflation fluid opening 86 allows inflation fluid to flow from the inflator 72 into an inflation fluid volume 88 of the air bag 70 when the inflator 72 is actuated. Opposite the mouth portion 82, the air bag 70 has an outer panel 90 that is located distant from the reaction canister 80 when the air bag is inflated.

The reaction canister 80 as shown has a wall 92 that defines a vent opening 94. The vent opening 94 is in fluid communication with the inflation fluid volume 88 of the air bag 70. A door retainer 98 is fixed to the reaction canister 80 adjacent the vent opening 94.

The module 10a includes a vent member 100 for selectively closing the vent opening 94. The vent member 100 is formed as a door supported on the reaction canister 80 at a location adjacent the vent opening 94. The door 100 is supported on the reaction canister 80 for sliding movement relative to the reaction canister. The door retainer 98 and the wall 92 of the reaction canister 80 cooperate to guide the sliding movement of the door 100.

The door 100 has a first condition shown in FIG. 3 in which the door is spaced apart from the vent opening 94 in the reaction canister 80. When the door 100 is in the first condition, the vent opening 94 in the reaction canister 80 is not blocked, and inflation fluid can flow away from the air bag 70 through the vent opening.

The door 100 has a second condition shown in FIG. 4 in which the door overlies the vent opening 94 in the reaction canister 80. When the door 100 is in the second condition, the vent opening 94 is blocked and inflation fluid cannot flow away from the air bag 70 through the vent opening.

The apparatus 10a includes one or more tethers 110 for controlling operation of the vent door 100. In the illustrated embodiment, only one tether 110 is used. The tether 110 has a first part or first end portion 112 that is fixed to a first portion 113 of the outer panel 90 of the air bag 70. An opposite second part or second end portion 114 of the tether 110 is fixed to a second portion 115 of the outer panel 90. Both the first and second portions 113 and 115 of the air bag 70 are offset laterally from the center point 118 of the outer panel 90.

An intermediate portion 120 of the tether 110 extends around a pin 122 or other portion of the vent door 100. The tether 110 may also extend through a tether guide (not shown) fixed to the reaction canister 80. The intermediate portion 120 of the tether 110 is freely slidable relative to the vent door 100 in response to forces applied to one or both end portions 112 and 114 of the tether. As the intermediate portion 120 of the tether 110 moves relative to the vent door 100, the distance between the first end portion 112 of the tether and the vent door varies in inverse relationship to the distance between the second end portion 114 of the tether and the vent door.

When the air bag 70 is in a deflated condition (not shown), the outer panel 90 of the air bag is close to or adjacent the mouth portion 82. There is a significant amount of slack in the tether 110. The vent door 100 is in the first condition as shown in FIG. 3, in which the vent door does not cover the vent opening 94 in the reaction canister. As a result, inflation fluid may be able to flow away from the air bag 70 through the vent opening 94.

When the air bag 70 is inflated, the outer panel 90 of the air bag moves away from the reaction canister 80 and the vent door 100. The first and second end portions 112 and 114 of the tether 110 also move away from the vent door 100.

The air bag 70 might inflate fully without contacting a vehicle occupant or other object during inflation. In that situation, as shown in FIG. 4, the entire outer panel 90 moves fully away from the vent door 100, carrying with it both the first end portion 112 and the second end portion 114 of the tether 110. Each of the first and second end portions 112 and 114 of the tether 110 moves away from the vent door 100 by a substantial distance. As a result of this movement, the combined distances between (a) the first end portion 112 of the tether 110 and the vent door 100 and (b) the second end portion 114 of the tether and the vent door 100 substantially equal the length of the tether 110 between the first and second end portions. The tether 110 is, therefore, stretched out sufficiently to remove its slack.

The tightened tether 110, through the intermediate portion 120 of the tether, pulls on the pin 122. The vent door 100 is pulled from the first condition to the second condition in which it covers the vent opening 94 in the reaction canister 80. The vent opening 94 in the reaction canister 80 closes, blocking flow of inflation fluid away from the air bag 70 through the vent opening. The air bag 70 inflates with full force and pressure.

The inflating air bag 70 might, alternatively, contact a vehicle occupant positioned relatively close to the reaction canister 80 and centered laterally relative to the reaction canister. If this occurs, the engagement of the air bag 70 with the vehicle occupant stops or limits outward movement of the outer panel 90 of the air bag. If the combined distances between (a) the first end portion 112 of the tether 110 and the vent door 100 and (b) the second end portion 114 of the tether and the vent door substantially equal the length of the tether between the first and second end portions, as described above, then the tether is stretched out sufficiently to remove its slack. The vent door 100 is moved from the open condition to the closed condition, blocking flow of inflation fluid away from the air bag 70 through the vent opening 94.

In another alternative deployment scenario, the combined distances between (a) the first end portion 112 of the tether 110 and the vent door 100 and (b) the second end portion 114 of the tether and the vent door might not substantially equal the length of the tether between the first and second end portions. In this case, the tether 110 is not stretched out sufficiently to remove its slack. The tether 110 does not exert sufficient force on the vent door 100 to move the vent door from the first condition to the second condition.

An example of this deployment scenario is shown in FIG. 3. Even though a portion of the outer panel 90 has moved fully away from the vent door 100, carrying with it the first end portion 112 of the tether 110, the second end portion 114 of the tether remains relatively close to the vent door because of contact with a vehicle occupant 62. Because the intermediate portion 120 of the tether 110 is slidable about the pin 122 of the vent door 100, the movement of the first end portion 112 of the tether away from the vent door causes the distance between the first end portion 112 and the vent door to increase and the distance between the second end portion 114 and the vent door to decrease. The distance between the first end portion 112 of the tether 100 and the vent door 100 varies in inverse relationship to the distance between the second end portion 114 of the tether and the vent door. The movement of the tether 110 therefore does not cause the tether to be tensioned sufficiently to move the vent door. The vent opening 94 remains uncovered, enabling venting of inflation fluid away from the air bag 70.

The tether 110 is thus operative to cause the vent door 100 to move so as to close the vent opening 94 only in response to movement of the first and second tether end portions 112 and 114 away from the vent door by a combined amount in excess of a predetermined amount. That is, the vent door 100 is closed only when the air bag 70 is deployed in a manner such that the combined distances between (a) the first part 112 of the tether 100 and the vent door and between (b) the second part 114 of the tether and the vent door substantially equal the length of the tether between the first and second parts 112 and 114.

Figure 6:
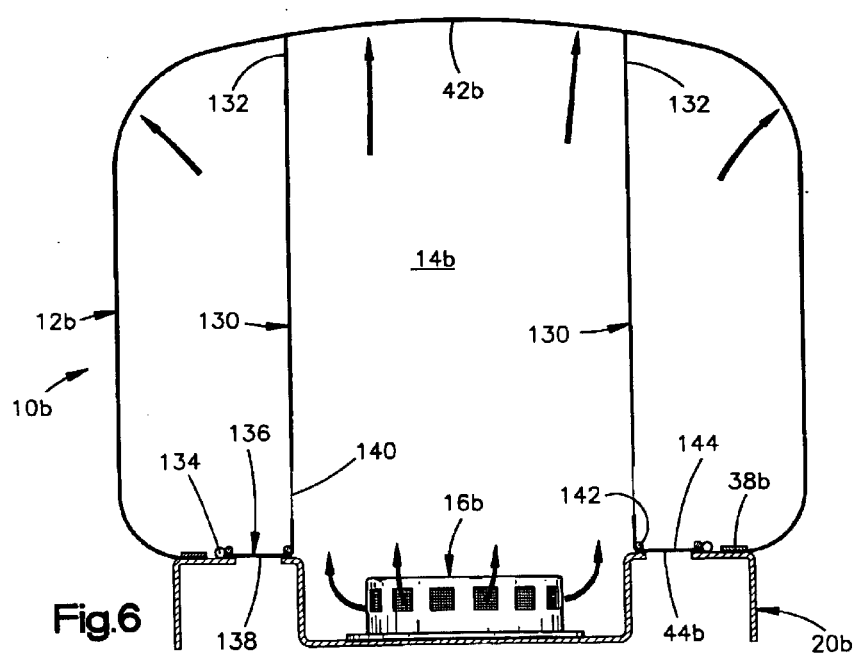
FIG. 6 is a view similar to FIG. 5 showing the protection apparatus with the vent closed.

FIGS. 5 and 6 illustrate an air bag module 10b in accordance with a third embodiment of the invention. Portions of the air bag module 10b that are the same as or similar to corresponding portions of the air bag module 10 (FIGS. 1–2) are given the same reference numerals with the suffix "b" added.

The module 10b includes an air bag 12b and two identical tethers 130. Each tether 130 has a first end portion 132 that is fixed to the outer panel 42b of the air bag 12b by sewing. An opposite second end portion 134 of each tether 130 is formed as a stop member. Adjacent each stop member 134 is a vent member 136. The vent member 136 includes a solid tether portion 138 and a vent opening 140.

The vent member 136 may be formed as one piece with the tether 130, as shown in FIGS. 5 and 6, including the first end portion 132 and the stop member 134. Alternatively, the vent member 136 may be formed as a separate member attached to the tether 130.

The module 10b includes a tether retainer 142 fixed to the reaction plate 20b, overlying the vent opening 44b in the reaction plate. The tether retainer 142 includes a third vent opening 144 that is aligned with the vent opening 44b in the reaction plate 20b. The vent member 136 is slidable through the tether retainer 142, relative to the reaction plate 20b.

When the air bag 12b is in a deflated condition (not shown), the outer panel 42b of the air bag is close to or adjacent the reaction plate 20b. There is a significant amount of slack in the tethers 130. The vent openings 140 in the vent members 136 are aligned with the vent openings 44b in the reaction plate 20b. As a result, inflation fluid may be able to flow away from the air bag 12b through the vent openings 44b.

When the air bag 12b is inflated, the outer panel 42b of the air bag moves away from the reaction plate 20b and the vent openings 44b. If the air bag 12b inflates by less than a certain amount (FIG. 5), the outer panel 42b moves away from the reaction plate 20b by less than a predetermined amount. This might happen, for example, if the air bag 12b when inflating contacts a vehicle occupant (as shown schematically at 62b in FIG. 5) positioned relatively close to the reaction plate 20b.

The engagement of the air bag 12b with the vehicle occupant 62b stops or limits outward movement of the outer panel 42b of the air bag. The tethers 130 are not stretched out sufficiently to remove the slack from the tethers. The tethers 130 do not pull the vent members 136 through the tether retainer 142, and the vent members 136 remain in the first condition. The vent openings 140 in the vent members 136 are aligned with the vent openings 44b in the reaction plate 20b, enabling flow of inflation fluid away from the air bag 12b through the vent openings. This venting of the air bag 12b can reduce the force and pressure with which the air bag inflates.

If the air bag 12b inflates by more than a certain amount (FIG. 6), the outer panel 42b moves away from the reaction plate 20b by a predetermined amount. Such movement might occur if the air bag inflates fully to help protect a vehicle occupant seated against the vehicle seat back. This movement of the outer panel 42b away from the reaction plate 20b by the predetermined amount causes the tethers 130 to be tensioned, as shown in FIG. 6. The slack is pulled out of the tethers 130. The vent members 136 are pulled through the tether retainer 142 to a second condition in which the solid tether portions 138 of the vent members 136 overlie the vent openings 44b in the reaction plate 20b. The vent openings 44b are closed, blocking flow of inflation fluid away from the air bag 12b through the vent openings. The air bag 12b inflates with full force and pressure.

FIG. 7 illustrates an air bag module 10c in accordance with a fourth embodiment of the invention. Portions of the air bag module 10c that are the same as or similar to corresponding portions of the air bag module 10 of FIGS. 1 and 2 are given the same reference numerals with the suffix "c" added.

The air bag module 10c illustrated in FIG. 7 is a driver side frontal air bag module that includes an air bag 12c and an inflator 16c for inflating the air bag. The air bag 12c has an inflation fluid volume 14c. The inflator 16c is actuatable for providing inflation fluid for inflating the air bag 12c.

The inflator 16c and the air bag 12c are supported on a support member 20c. The support member 20c is a member or assembly that is secured to the vehicle and that receives the reaction forces of the inflator 16c and the air bag 12c when the inflator is actuated. In the illustrated embodiment, the support member 20c is a reaction plate.

The reaction plate 20c is a single piece of material, such as metal or high strength plastic, that is formed to the illustrated configuration. The reaction plate 20c has an annular main body portion 22c centered on an axis 24c. An outer wall 26c of the reaction plate 20c extends downward, as viewed in FIG. 7, from the main body portion 22c. A cylindrical inner wall 28c of the reaction plate 20c extends downward, again as viewed in FIG. 7, from the main body portion 22c in a direction parallel to the outer wall 26c at a location spaced radially inwardly from the outer wall. A circular center wall 30c caps the inner wall 28c of the reaction plate 20c.

The inner wall 28c and the center wall 30c of the reaction plate 20c define a cylindrical inflator mounting chamber 32c. The inflator 16c is located in the chamber 32c and is secured to the reaction plate 20c in a known manner. The inner wall 28c and the outer wall 26c of the reaction plate 20c define a toroidal vent chamber 34c of the reaction plate. The toroidal vent chamber 34c is located radially outwardly of the inflator mounting chamber 32c.

A bag retainer 38c secures a mouth portion 36c of the air bag 12c to the main body portion 22c of the reaction plate 20c. The mouth portion 36c of the air bag 12c defines an inflation fluid opening for receiving inflation fluid from the inflator 16c. The inflation fluid opening allows inflation fluid to flow from the inflator 16c into the inflation fluid volume 14c of the air bag 12c when the inflator is actuated. Opposite the mouth portion 36c, the air bag 12c has an outer panel 42c. The outer panel 42c moves away from the reaction plate 20c as the air bag is inflated.

Two diametrically opposed vent openings 44c are formed in the main body portion 22c of the reaction plate 20c. The vent openings 44c are located radially inwardly of the mouth portion 36c of the air bag 12c. The vent openings 44c in the air bag module 10c illustrated in FIG. 7 are identical. A number of vent openings 44c other than two may be provided. The vent openings, when multiple vent openings are provided, may have different configurations from one other. Each of the vent openings 44c of FIG. 7 has a generally rectangular configuration.

The air bag module 10c also includes two vent members 46c. Each one of the vent members 46c is associated with a respective one of the vent openings 44c. The two vent members 46c illustrated in FIG. 7 are identical to one another.

FIG. 9 is a plan view of one of the vent members 46c of the air bag module of FIG. 7. The vent member 46c shown in FIG. 9 is generally planar and has a generally rectangular configuration. The vent member 46c includes opposite upper and lower surfaces 202 and 204, respectively. FIG. 9 only illustrates the upper surface 202 of the vent member 46c. FIGS. 7 and 8 illustrate both the upper and the lower surfaces 202 and 204 of one of the vent members 46c.

As shown in FIG. 9, the vent member 46c includes an attaching portion 208 and a closing portion 210. A living hinge 212 separates the attaching portion 208 and the closing portion 210. The living hinge 212 is formed by two collinear, elongated slots 214 that extend through the vent member 46c and define three hinge portions 218. The living hinge 212 enables bending of the closing portion 210 of the vent member 46c relative to the attaching portion 208.

The attaching portion 208 of the vent member 46c includes three apertures 222. Each aperture 222 is adapted for receiving an associated fastener for fixing the attaching portion 208 of the vent member 46c to the main body portion 22c of the reaction plate 20c. FIGS. 7 and 8 illustrate a portion of a rivet 226 that secures the attaching portion 208 of the vent member 46c to the main body portion 22c of the reaction plate 20c. Fasteners other than rivets may also be used for securing the attaching portion 208 of the vent member 46c to the main body portion 22c of the reaction plate 20c. As an alternative to fasteners, the attaching portion 208 of the vent member 46c may be welded to the main body portion 22c of the reaction plate 20c.

The closing portion 210 of the vent member 46c has dimensions that are greater than the dimension of its associated vent opening 44c. A slot 228 extends through the closing portion 210 of the vent member 46c in a location spaced apart from the living hinge 212.

The vent member 46c is preferably stamped from a single sheet of steel. The vent member 46c has a material stiffness sufficient to prevent bending or warping of the vent member due to vibrations or temperature extremes that are common in vehicles.

As shown in FIGS. 7 and 8, when the vent member 46c is attached to the main body portion 22c of the reaction plate 20c, the vent member 46c is located in the toroidal vent chamber 34c of the reaction plate 20c. The attaching portion 208 of the vent member 46c is secured to the reaction plate 20c in a location for positioning the closing portion 210 across its associated vent opening 44c. Thus, when the vent member 46c is positioned as shown in FIG. 7, the closing portion 210 closes its associated vent opening 44c. When the closing portion 210 of the vent member 46c closes its associated vent opening 44c, as is shown in FIG. 7, the vent member is said to be in a first condition.

The vent member 46c also has a second condition. FIG. 8 illustrates the vent member in the second condition. In the second condition, the vent member 46c is bent at the living hinge 212 so that the closing portion 210 of the vent member 46c is spaced apart from its associated vent opening 44c in the reaction plate 20c. When the vent member 46c is in the second condition, its associated vent opening 44c is open so that fluid may flow through the vent opening.

The air bag module 10c also includes two tethers 50c. Each of the tethers 50c is associated with a different one of the vent members 46c. Each tether 50c has a first end portion 52c that is fixed to the outer panel 42c of the air bag 12c by sewing. The first end portion 52c of the tether 50c is thus connected for movement with the outer panel 42c of the air bag 12c as the air bag is inflated. An opposite second end portion 56c of each tether 50c is attached to the associated vent member 46c. To connect the second end portion 56c to its associated vent member 46c, the second end portion 56c is inserted through the slot 228 in the closing portion 210 of the vent member 46c from the upper surface 202 to the lower surface 204 and is knotted at a location below the lower surface. As an alternatively to being knotted, the second end portion 56c of the tether 50c may be connected with an element, such as a washer (not shown), having dimensions greater than the dimensions of the slot 228. When the second end portion 56c of the tether 50c extends through the slot 228, fluid flow through the slot 228 is essentially prevented. Other methods of connecting the second end portion 56c to the closing portion 210 of the vent member 46c are also contemplated by this invention. For example, a fastener (not shown) may connect the second end portion 56c of the tether 50c to the closing portion 210 of the vent member 46c.

The air bag module 10c also includes a cover 240. The cover 240 includes a front panel 242 and an annular side panel 244. The front panel 242 of the cover 240 includes a tear seam 248 that ruptures to enable deployment of the air bag 12c from the air bag module 10c. The side panel 244 of the cover 240 extends perpendicularly from the front panel 242. A lower portion of the side panel 244 is located radially outwardly of the outer wall 26c of the reaction plate 20c. A plurality of fasteners 250, two of which are shown in FIG. 7, attached the side panel 244 of the cover 240 to the outer wall 26c of the reaction plate 20c.

A chamber 254 is defined in the air bag module 10c between the cover 240 and the reaction plate 20c. When the air bag module 10c is in a non-actuated condition, as shown in FIG. 7, the deflated air bag 12c is folded and stored in the chamber 254. When stored in the chamber 254, the outer panel 42c of the air bag 12c is adjacent the front panel 242 of the cover 240. Also when the air bag module 10c is in the non-actuated condition, there is a significant amount of slack in the tethers 50c. The slack is present because the length of each tether 50c is greater than the distance between the portion of the air bag 12c where the first end portion 52c of the tether is fixed to the outer panel 42c and the vent member 46c where the second end portion 56c of the tether is located. The slack is provided by intermediate portions 58c of the tethers 50.

When the air bag module 10c is in the non-actuated condition, as is shown in FIG. 7, the vent members 46c are in the first condition closing their associated vent openings 44c. When the vent members 46c are in the first condition, debris and other foreign matter are prevented from entering the chamber 254 of the air bag module 10c through the vent openings 44c. The vent members 46c of the air bag module 10c are in the first condition prior to actuation of the inflator 16c.

When the inflator 16c of the air bag module 10c is actuated, inflation fluid exits the inflator 16c and begins to fill the air bag 12c. In response to receiving inflation fluid from the inflator 16c, the air bag 12c expands slightly within the chamber 254 and begins to press against the front panel 242 of the cover 240. As additional inflation fluid enter the air bag 12c, the air pressure within the air bag 12c increases. The air pressure within the air bag 12c acts on the upper surfaces 202 of the vent members 46c. Since the lower surfaces 204 of the vent members 46c are subject to atmospheric pressure, a pressure differential arises across the closing portion 210 of each vent member 46c. When the pressure differential reaches a predetermined level, each vent member 46c bends at its living hinge 212 and the closing portion 210 moves away from the vent opening 44c. Thus, in response to the pressure differential, the vent members 46c move from the first condition, shown in FIG. 7, to the second condition, shown in FIG. 8. When the vent members 46c are in the second condition, inflation fluid may flow out of the chamber 254 through the vent openings 44c.

At the point of air bag deployment illustrated in FIG. 8, the output of inflation fluid from the inflator 16c is greater than the amount of inflation fluid that may exit the air bag 12c through the vent openings 44c. As a result, the air pressure within the air bag 12c continues to increase after the vent members 46c are moved to the second condition. The increasing air pressure in the air bag 12c results in an increasing pressure applied to the front panel 242 of the cover 240. The increasing pressure applied to the front panel 242 of the cover 240 eventually ruptures the tear seam 248 of the front panel of the cover and enables the air bag 12c to expand outward of the chamber 254 of the air bag module 10c.

FIGS. 10 and 11 illustrate the air bag 12c expanded outward of the chamber 254 of the air bag module 10c. FIG. 10 illustrates the air bag 12c partially expanded with the outer panel 42c having moved away from the reaction plate 20c by less than the predetermined distance. FIG. 11 illustrates the air bag 12c near full expansion with the outer panel 42c having moved away from the reaction plate 20c by more than the predetermined distance. For ease of illustration, the cover 240 is not shown in FIGS. 10 and 11.

As the air bag 12c inflates, the outer panel 42c of the air bag 12c moves away from the reaction plate 20c and away from the vent members 46c. If the outer panel 42c moves away from the reaction plate 20c by less than the predetermined distance, slack remains in the tethers 50c. The outer panel 42c of the air bag 12c may move away from the reaction plate 20c by less than the predetermined distance, for example, if the air bag 12c when inflating engages a vehicle occupant (as shown schematically at 62c in FIG. 10) who is positioned relatively close to the reaction plate 20c. The engagement of the air bag 12c with the relatively close vehicle occupant 62c stops or limits the movement of the outer panel 42c of the air bag away from the reaction plate 20c and away from the vent members 46c.

When slack remains in the tethers 50c as a result of the outer panel 42c moving away from the reaction plate 20c by less than the predetermined distance, the tethers 50 do not pull on the vent members 46c. The vent members 46c remain in the second condition, spaced apart from the vent openings 44c. The vent openings 44c remain open, enabling the flow of inflation fluid away from the air bag 12c through the vent openings and to atmosphere. This venting of the air bag 12c can reduce the force and pressure with which the air bag inflates.

When the outer panel 42c of the air bag 12c moves away from the reaction plate 20c by more than the predetermined amount, as is shown in FIG. 11, the slack is completely removed from the tethers 50c and the tethers are tensioned. The tensioned tethers 50c pull the vent members 46c from the second condition, shown in FIG. 10, back toward the first condition in which the vent members 16c block the flow of inflation through the vent openings 44c. When the vent members 46c are moved back into the first position during inflation of the air bag 12c, the air bag 12c inflates with full force and pressure.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant protection apparatus comprising:
    an inflatable vehicle occupant protection device;
    a support member having a vent opening;
    a vent member associated with the vent opening and having a first condition in which the vent member closes the vent opening and a second condition in which the vent member is spaced apart from the vent opening enabling fluid flow through the vent opening; and
    a tether extending between the protection device and the vent member,
    the vent member initially being in the first condition and being moved from the first condition to the second condition for enabling a flow of inflation fluid through the vent opening upon initial inflation of the protection device, the vent member being moved from the second condition back toward the first condition by tension in the tether that results from inflation of the protection device away from the support member by more than a predetermined distance.

2. The apparatus of claim 1 wherein the vent member includes a living hinge for enabling bending of the vent member, the vent member being bent at the living hinge when moving from the first condition to the second condition.

3. The apparatus of claim 1 wherein the vent member includes a material stiffness that is sufficient for preventing movement of the vent member from the first condition to the second condition as a result of vibrations.

4. The apparatus of claim 1 wherein the vent member includes a first portion that is secured to the support member and a second portion that moves relative to the support member and the first portion of the vent member for moving the vent member between the first and second conditions.

5. The apparatus of claim 1 wherein the vent member includes a slot, the tether extending through the slot of the vent member from a first surface of the vent member to a second surface of the vent member, the tether, when tensioned, acting on the second surface of the vent member for moving the vent member from the second condition back toward the first condition.

6. The apparatus of claim 1 further including a cover that is supported by the support member and that defines a chamber in which the protection device is stored prior to being inflated, the cover including a tear seam that ruptures for enabling the protection device to expand outward of the chamber, the vent member being moved from the first condition to the second condition prior to the tear seam of the cover rupturing.

7. The apparatus of claim 1 further including an inflator that is actuatable for providing inflation fluid for inflating the protection device, the support member supporting the inflator, inflation fluid resulting from actuation of the inflator acting upon the vent member to move the vent member from the first condition to the second condition.

8. The apparatus of claim 1 wherein the vent opening, the vent member, and the tether are a first vent opening, a first vent member, and a first tether, respectively, the support member also including a second vent opening that is spaced apart from the first vent opening, a second vent member associated with the second vent opening and also having a first condition in which the second vent member closes the second vent opening and a second condition in which the second vent member is spaced apart from the second vent opening enabling fluid flow through the second vent opening, a second tether extending between the protection device and the second vent member, the second vent member initially being in the first condition and being moved from the first condition to the second condition for enabling a flow of inflation fluid through the second vent opening upon initial inflation of the protection device, the second vent member being moved from the second condition back toward the first condition by tension in the second tether that results from inflation of the protection device away from the support member by more than the predetermined distance.

9. The apparatus of claim 8 wherein the first and second vent openings are located at diametrically opposite positions in the support member.

10. The apparatus of claim 8 wherein the first and second tethers operate independently of one another for closing the first and second vent members, respectively.

11. The apparatus of claim 8 further including an inflator that is actuatable for providing inflation fluid for inflating the protection device, the support member supporting the inflator, inflation fluid resulting from actuation of the inflator acting upon the first vent member to move the first vent member from the first condition to the second condition, inflation fluid resulting from actuation of the inflator also acting upon the second vent member to move the second vent member from the first condition to the second condition.

* * * * *